(12) United States Patent
Noro et al.

(10) Patent No.: US 6,175,604 B1
(45) Date of Patent: Jan. 16, 2001

(54) CLOCK SYNCHRONIZATION OVER DATA TRANSMISSION NETWORKS

(76) Inventors: Raffaele Noro; Jean-Pierre Hubaux; Maher Hamdi, all of EPFL-DI-ICA, IN Ecublens, Lausanne CH-1015 (CH)

( * ) Notice: Under 35 U.S.C. 154(b), the term of this patent shall be extended for 0 days.

(21) Appl. No.: 09/122,966

(22) Filed: Jul. 27, 1998

(51) Int. Cl.$^7$ ................................................ H04N 7/475
(52) U.S. Cl. ........................ 375/364; 370/514; 348/518
(58) Field of Search ..................... 375/354, 356, 375/357, 364; 370/507, 514, 520; 348/500, 518, 512

(56) References Cited

U.S. PATENT DOCUMENTS

| | | | |
|---|---|---|---|
| 5,386,437 | 1/1995 | Yasuda | 375/120 |
| 5,416,808 | 5/1995 | Witsaman et al. | 375/350 |
| 5,535,216 | * 7/1996 | Goldman et al. | 370/100.1 |
| 5,883,924 | * 3/1999 | Siu et al. | 375/226 |

* cited by examiner

Primary Examiner—Amanda T. Le
(74) Attorney, Agent, or Firm—Page Lohr

(57) ABSTRACT

A technique has been devised which may be used to synchronize a receiver clock to a transmitter clock at either end of a transmission network having jitter intrinsic therein. The technique is characterized by a modified least squares linear regressive approach which takes advantage of assumptions particular to such transmission networks. The technique finds advantages in comparison to commonly used phase-locked loop techniques which have long startup phase delays where clocks are not in sync. The modified least squares linear regressive technique of the invention provides excellent isolation of jitter and other timing variations while simultaneously providing for quick startup.

18 Claims, 1 Drawing Sheet

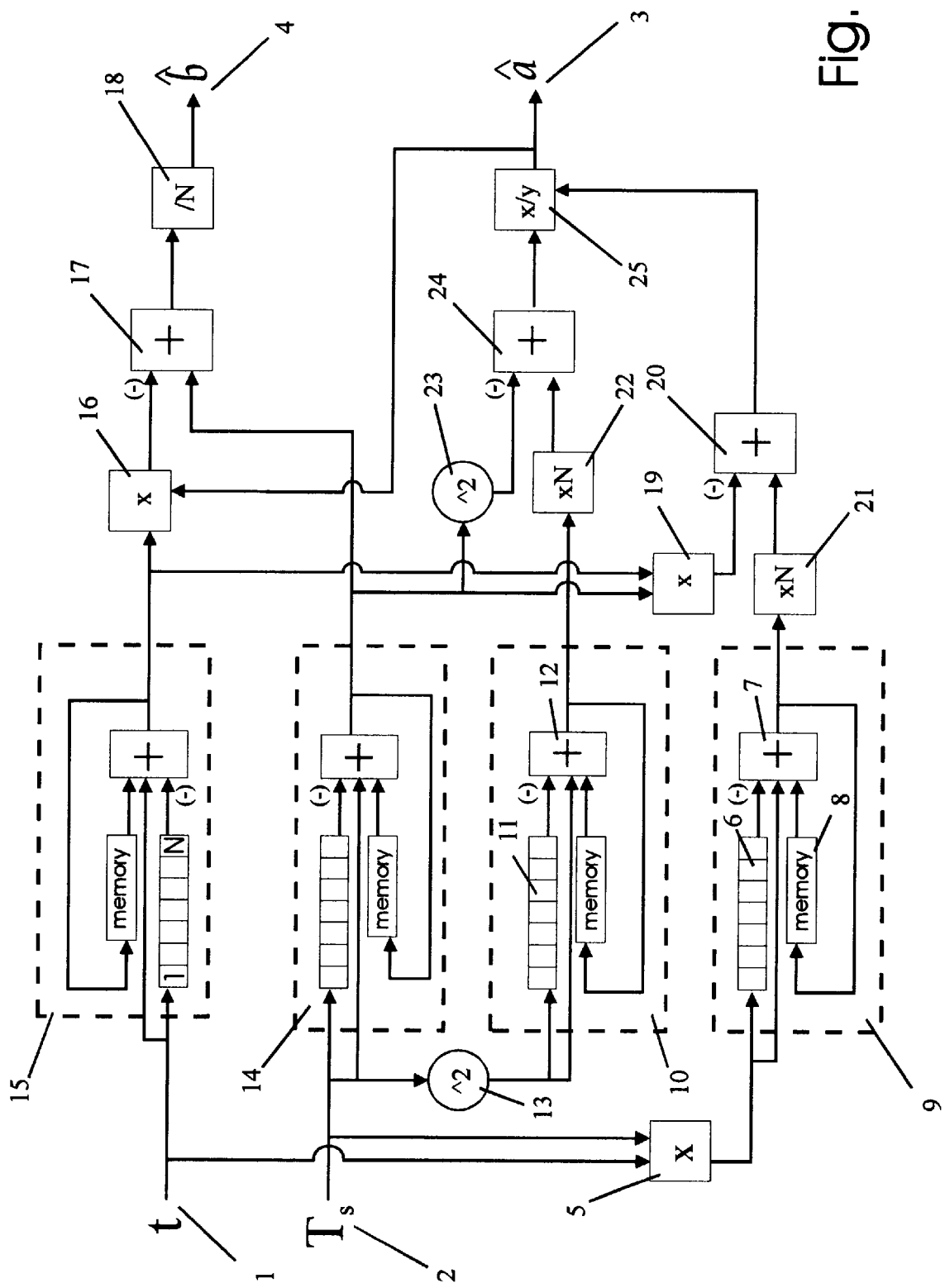

CLOCK SYNCHRONIZATION OVER DATA TRANSMISSION NETWORKS

BACKGROUND OF THE INVENTION

1. Field

The following invention disclosure is generally concerned with the synchronization of receiver and transmitter timebases in data transmission networks and specifically concerned with a least squares linear regression technique having a fast startup phase and improved jitter absorption.

2. Prior Art

Recent developments and advances in information technologies have led to new and unanticipated problems. In particular, transfer of data from a server to a requesting client presents certain complication. In addition, the types and formats of data to be transferred have attributes which may further complicate matters. For example, video data comprises a series of still frames which must be played one after another in a predefined and well regulated time sequence. Accordingly, information relating to the image data must be transferred along with information relating to the timing of playback events. Proper transmission of video images requires a scheme to preserve signal timing attributes from a transmitting station to a receiving station.

For proper play-back, an audio-video signal is preferably played out at the same rate which it is transmitted. This is especially important in interactive systems where "real-time" properties are maintained. If a receiver clock is independent from a transmitter clock then the receiver may play frames slightly faster than it receives them and lead the system into a data starvation condition. Alternatively, if the receiver plays frames too slowly, then a data overflow condition may occur at a data buffer having a limited size.

In certain transmission networks a data stream is divided into many portions or "packets" and transmitted along various paths of the network. These packets may be subject to time delays which are random in length. Sometimes and herein referred to as "jitter", random time delays are necessarily inherent in networks which transmit data in data subsets. Each data packet may arrive at a receiver with a total transmission time which may vary from packet to packet. Depending upon the network path and network congestion conditions, transmission time delays may be highly different between packets. For audio-video data to be useful, it must be transmitted through the packet network and played back in a manner where the time delays or network jitter does not show up as artifacts in the presentation level play back. In order to achieve this, it is necessary that a time base of the transmitting station be replicated at the receiver and thus the "clocks" of the terminal end are said to be synchronized.

Most popular processing devices of digital audio-video data, like TV decoders or PC video boards, define a syntax for coding, decoding, transport and storage of audio-video data streams. This scheme includes provision for a shared time-base between the terminal ends, i.e., the sender and the receiver. For proper processing of digital audio-video signals, it is necessary that a clock of the receiver be synchronized to a clock of the transmitter. Presently, digital audio-video signals are processed within systems which employ a phase-lock loop technique to synchronize a receiver clock to the transmitter clock. The technique is old and reliable and has made its way into many thousands of similar applications where a slave clock is necessarily coupled to a master clock. However, the technique suffers from problems which arise do to the nature of the feedback loop. A phase-locked loop may require many feedback cycles before the slave clock becomes locked to the master clock. This is especially true when the allowable error (clock cycle or frequency) is small. If the phase of the slave clock must be precisely matched with the master, then the lock may take a considerable amount of time to achieve. The period of time for the clocks to become in sync may be referred to as a "startup phase". Accordingly, a phase-locked loop having high precision requirements may have a long startup phase. Transmission systems which employ phase-locked loop techniques are slow to realize the lock and perfect the transmission of audio-video data. While the startup phase is incomplete, an application may play audio-video data where timing artifacts show up at the presentation level.

In systems where the time to acquire a lock is short compared to the time in which a lock is held, the problem is not of serious consequence, however, for some systems the time extent of the signal is relatively short and the required lock time becomes problematic. For example, in real-time applications such as interactive teleconferencing. The first few seconds of each data exchange may suffer from a clock which is out of sync. Since the duration of any single transmission may only be of the order of a few seconds, startup phase errors due to phase-locked loop techniques become perceivable to the end user. Accordingly, it becomes desirable to find a scheme which locks a slave clock to a master clock where the time to obtain a lock is shorter than that which is associated with a phase-locked loop.

Yasuda teaches a modified phase-locked loop technique in U.S. Pat. No. 5,386,437 published Jan 31, 1995.

A primary objective of that teaching is a variable output which varies in relation to phase error to produce a desired characteristic during pull-in and during synchronization. The techniques provide for avoiding a step-like sudden change of clock frequencies. While being a significant improvement, the system remains a version of a phase-locked loop technique which has a long pull-in or start up period and is consequently not appropriate for applications requiring synchronization where the session length is short.

Inventors Witsaman et al disclose an apparatus for synchronizing a plurality of clocks in a simulcast network to a reference clock. U.S. Pat. No. 5,416,808 dated May 16, 1995 sets forth a scheme whereby a centralized reference clock keeps a time which is accessible over a large geographic area. Individual distributed clocks are manipulated in accordance with comparisons of their time with the time on the reference clock.

While the systems and inventions of the prior art are designed to achieve particular goals and objectives, some of those being no less than remarkable, these inventions have limitations which prevent their use in new ways now possible. These prior art inventions are not used and cannot be used to realize the advantages and objectives of the present invention.

SUMMARY OF THE INVENTION

Comes now, Raffaele Noro and Jean-Pierre Hubaux with an invention of apparatus and methods relating to clock synchronization over data transmission networks including a least squares linear regression technique and device for executing same, having fast startup phase and high jitter absorption. It is a primary function of these apparatus and methods to provide means of reducing the time required to reach a synchronized state while maintaining synchronization accuracy. It is a contrast to prior art methods and devices that those systems do not reach a synchronization lock without first enduring a long startup period. A fundamental difference between a phase-locked loop of the prior art and the instant invention can be found when considering handling of timing indicators which are coded onto a signal being transmitted.

In systems of the invention, an apparatus receives a data stream containing timing indicators, which are used in a least squares linear regression technique to synchronize the time-base of a transmitting station with that of a receiving station. Timing indicators, commonly called program clock references or PCRs, contain timing information and are generated at the transmitter end in accordance with a data transmission coding syntax. After data streams are received at an apparatus of the invention on a receiving end, the PCRs are separated from the base signal and are used to drive a modified least squares linear regression technique which produces timing information to reconstruct the time base of the transmitting station.

A conventional least squares linear regression approach is modified to reduce complexity and provide for implementation in a physical system. A mathematical modification relates to an assumption which may be made about the transmitter and receiver clocks which necessarily have frequencies which are close to each other. This simplification which is applicable to transmission systems reduces the computing overhead necessary to implement the method via standard hardware.

OBJECTIVE OF THE INVENTION

It is a primary object of the invention to provide apparatus and technique for synchronizing the time-bases of the terminal ends of a transmission network.

It is an object of the invention to provide an improved synchronization system in transmission networks used for transmission of time sensitive data having a reduced startup phase.

It is a further object to provide improved synchronization systems in transmission networks used for transmission of time sensitive data having high tolerance of jitter introduced by such transmission networks.

It is an object of the invention to provide synchronization systems for interactive applications where a short startup phase is required.

It is an object of the invention to provide an apparatus having a hardware implementation corresponding to the technique of least squares linear regression to slave a receiver time base to a sender or master time base, the sender or master sending time indicators over data networks and the receiver or slave receiving time indicators from the same data transmission networks.

A better understanding can be had with reference to the detailed description of Preferred Embodiments and drawing figure herefollowing. These embodiments represent particular ways to realize the invention and are not inclusive of all ways possible. Therefore, there may exist embodiments that do not deviate from the spirit and scope of this disclosure as set forth by the claims, but do not appear here as specific examples. It will be appreciated that a great plurality of alternative versions are possible.

BRIEF DESCRIPTION OF THE DRAWING FIGURE

These and other features, aspects, and advantages of the present invention will become better understood with regard to the following description, appended claims and drawing where:

FIG. 1 represents a preferred embodiment of the invention as a set of components that perform elementary operations on received time indicators, which are then processed to update the frequency adjustment â and clock offset b̂. (note: the symbol (−) indicates the sum of a negative number, i.e. subtraction)

PREFERRED EMBODIMENTS OF THE INVENTION

To recreate the time-base of a transmitting station at a receiving station, one may consider the receipt of program clock references, determine a trend, and anticipate the future by fitting a line to the received events. This technique, in general, is sometimes preferred to as the method of least squares and was developed by Gauss. By fitting a regression curve to data received in the form of program clock references, it becomes possible to derive the time-base of the transmitter and create an identical time-base for the receiver and thus synchronizing the clocks respectively. This approach has the advantage that receipt of only a few program clock references suggests a good fitted line. Thus, in a very short time one may form a clock synchronized to the transmitter.

However, the method of least squares is mathematically complicated and may require significant computing power which is not required in phase locked loop systems. Recall that a phase-locked loop system may be easily implemented in hardware and does not require computations.

It has been discovered that mathematical equations describing a method of least squares is subject to simplification when certain assumptions relating to the particular problem at hand are valid. Therefore, the amount of computing may be reduced and made more favorable to implementation in real systems.

The following modified method of least squares linear regression, when applied to time indicators, for example those hosted by digitized and coded audio video data sets, serves well to provide basis upon which a receiver clock may by synchronized to a transmission station's clock.

Glossary of Terms

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. For purposes of this disclosure:

Audio (Video)

Audio (and video) refers to a data type including a collection of audible samples (respectively, still images) which may be played in a sequence highly regulated in time.

Phase-Locked Loop

Phase-locked loop is a technique where a local oscillator is coupled by way of feedback loop to a master oscillator which provides timing control for the local oscillator.

Jitter

Jitter refers to timing irregularities which accompany transfer of information through transmission networks.

Master and Slave clocks

A master clock is an independent clock which runs at a preset rate. A slave clock is a dependent clock which runs at a variable rate which is under influence of a master clock.

Packet

A packet is a data subset which contains a portion of a data stream. Packets are unitary data objects which may be transmitted through a network.

Startup phase

Startup phase refers to the period of time from which a synchronization system is initiated and to which a stable synchronization occurs.

Program Clock References

Program clock references are timing indicators which are embedded in some data formats which provide for information about program time.

Method of Least Squares

One will recall from Gauss the basic equation of the method of least squares:

$$\mu(x) = \alpha + \beta x$$

where $\mu(x)$ is the mean of y which is a function of x in the ordinary sense.

In preferred embodiments of the invention it is assumed that the sender and receiver of the data stream are related by the following equation:

$$T_s(t) = aT_r(t) + b$$

Respectively, $T_s(t)$ and $T_r(t)$ are the time functions of the sender and the receiver, and $\hat{a}$ and $\hat{b}$ are the frequency drift and time offset. It can be assumed also that $T_r(t)$ is the measure of absolute time (i.e. $T_r(t)=t$).

The PCR generation and arrival processes are represented as follows:

$$PCR_g = \{T_s(t_i) : \forall i=1,2,3,\ldots\}$$

$$PCR_a = \{t_i + \Delta T_0 + \Delta t_i : \forall i=1,2,3,\ldots\}$$

where $\Delta T_o$ is the average end to end delay and $\Delta t_i$, the jitter, is a random variable.

Reconstruction of a sender's time-base can be carried-out with the least-square linear regression analysis: the linear regression is fitted so that the sum of the square of the distances of the points from the regression is at a minimum. Computation of baricentric point $(\bar{x},\bar{y})$ permits the estimation of $\hat{a}$ and $\hat{b}$ as follows:

$$\hat{a} = \frac{\sum_{i=1}^{N} T_s^2(t_i) - N \cdot \bar{y}^2}{\sum_{i=1}^{N} T_s(t_i) \cdot (t_i + \Delta T_0 + \Delta t_i) - N \cdot \bar{x} \cdot \bar{y}}$$

$$\hat{b} = \bar{y} - \hat{a}\bar{x}$$

$$\bar{x} = \frac{\sum_{i=0}^{N}(t_i + \Delta T_0 + \Delta t_i)}{N}$$

$$\bar{y} = \frac{\sum_{i=0}^{N} T_s(t_i)}{N}$$

The equations above are quite complex when compared with conventional phase locked loop equations. The complexity accounts for considerable hindrance in applying least square linear regressive techniques to real decoder systems having finite computing resources. Therefore, it is considered an important part of the invention that the above equations be reduced to more manageable form.

Since it is a necessary condition that a transmitter clock frequency is close to a receivers clock frequency the following simplifications are implied. Making use of recursion, the mechanism is finally implemented as follows:

$$\sum_{k=0}^{N-1} T_s^2(t_i - t_k) = \sum_{k=1}^{N} T_s^2(t_{i-k}) + T_s^2(t_i) - T_s^2(t_{i-N})$$

$$\sum_{k=0}^{N-1} T_s(t_{i-k}) \cdot (t_{i-k} + \Delta T_0 + \Delta t_{i-k}) = \sum_{k=1}^{N} T_s(t_{i-k}) \cdot (t_{i-k} + \Delta T_0 + \Delta t_{i-k}) + T_s(t_i) \cdot (t_i + \Delta T_0 + \Delta t_i) - T_s(t_{i-N}) \cdot (t_{i-N} + \Delta T_0 + \Delta t_{i-N})$$

$$\frac{\sum_{k=0}^{N-1} T_s(t_{i-k})}{N} = \frac{\sum_{k=1}^{N} T_s(t_{i-k}) + T_s(t_i) - T_s(t_{i-N})}{N}$$

$$\frac{\sum_{k=0}^{N-1}(t_{i-k} + \Delta T_0 + \Delta t_{i-k})}{N} = \frac{\sum_{k=1}^{N}(t_{i-k} + \Delta T_0 + \Delta t_{i-k})}{N} + \frac{(t_i + \Delta T_0 + \Delta t_i) - (t_{i-N} + \Delta T_0 + \Delta t_{i-N})}{N}$$

$$\hat{a}_i = \frac{\sum_{k=0}^{N-1} T_s^2(t_{i-k}) - N \cdot \bar{y}_i^2}{\sum_{k=0}^{N-1} T_s(t_{i-k}) \cdot (t_{i-k} + \Delta T_0 + \Delta t_{i-k}) - N \cdot \bar{x}_i \cdot \bar{y}_i}$$

$$\hat{b}_i = \bar{y}_i - \hat{a}_i \cdot \bar{x}_i$$

$$\hat{T}_s(t) = \hat{a} \cdot t + \hat{b}$$

$$\hat{T}_s(t) = \hat{a}_i \cdot t + \hat{b}_i$$

$$t_i + \Delta T_0 + \Delta t_i < t < t_{i+1} + \Delta T_0 + \Delta t_{i+1}$$

In view of the equations presented above, receipt of several program clock references produces a good and reliable output which forms basis for a receiver time-base. A receiver clock may then be set in accordance with these equations to yield a synchronized system.

In most instances, it is preferred to receive several tens or even hundreds of program clock references before execution of the equations. Of course, the duration of the startup phase is affected by choice of upon how many data points the calculation is based. Therefore this number will change as startup phase limitations vary from one application to another.

The equations about are fully implemented in hardware in accordance with drawing FIG. 1 where a block schematic diagram is shown.

An apparatus of the invention is comprised of electronic components coupled together to form a circuit and to perform the operations described above.

The block diagram of FIG. 1 sets forth the major elements necessary and shows the connections of these elements with respect to each other.

As inputs (1,2), a circuit of the invention includes t timing information from a local clock and $T_s$ timing references from received signals. As outputs (3,4), the circuit has values which represent the frequency drift $\hat{a}$ and time offset $\hat{b}$.

A product operator is performed at a multiplier 5. The values of the local time and the collected clock reference are multiplied together and placed into a buffer 6 and simultaneously an adder 7. The adder output is coupled to a memory 8 which stores the sum values and conveys them to the adder as an input in later operations. Elements 6,7, and 8, form a summation module 9.

In a separate summation module 10, a buffer and adder 12 receive a value equal to the square of the signal clock reference which is computed and a squaring operator 13. Similar to the adder 7, adder 12 has an output which is coupled to memory for use in following samples.

Another module 14 is arranged to similarly perform a summation operation on the signal clock references $T_s$.

A module 15 performs summation operations on the local time reference t.

Module 15 has an output which is multiplied at a multiplier 16 with â and then added at adder 17 to the output of module 14. This sum is divided by the number of samples at divider 18 which has an output equal to the time offset b̂.

Outputs of summation modules 14 and 15 are multiplied together at multiplier 19 having an output coupled to an input of adder 20. A second input of adder 20 is connected to the output of multiplier 21 which operates to multiply the output of summation module 9 by the number of samples N.

Output of module 10 is similarly multiplied by the number of samples at multiplier 22. Output of summation module 14 is squared at the squaring operator 23. The previous two results are added at adder 24 having an output which is divided by the output of adder 20 at divider 25 to yield a value for frequency drift â.

The inputs of the circuit are coupled to the incoming timing indicators. The circuit also uses the arrival time of the indicators as measured in the receivers time base. Accordingly, the estimates of â and b̂ are updated in accordance with the equations above via the circuit described.

If the collection of program clock reference data elements is considered a window, then it becomes possible to enable sophisticated techniques which yield further information about the transmission systems. For example, if program clock references are received and grouped in windows which are interleaved in time, then it becomes possible to detect changes of long term end-to-end delay which is caused when the transmission path has been rerouted.

The careful observer will note that on occasion, as is normal in some packet networks, a packet is lost or severely delayed due to a heavy congestion state of the network. In this instance, the program clock references associated with late packets may be discarded or weighted such that its questionable reliability is accounted for in any calculation.

In accordance with each of the preferred embodiments of the invention, there is provided a method of clock synchronization over data transmission networks. It will be appreciated that each of the embodiments described include a method and that the method of one preferred embodiment may be different than the method of another embodiment.

One will now filly appreciate how a modified least squares linear regression technique may be applied to program clock references to synchronize clocks at either end of a transmission network. Although the present invention has been described in considerable detail with clear and concise language and with reference to certain preferred versions thereof including the best mode anticipated by the inventor, other versions are possible. Therefore, the spirit and scope of the invention should not be limited by the description of the preferred versions contained therein, but rather by the claims appended hereto.

We claim:

1. A method of synchronizing two clocks, one each at two terminal ends of a transmission network, the method comprising the steps:

produce a plurality of signals in at least two portions: a base signal portion, and a program clock reference portion;

transmit signals across a transmission network;

receive a plurality of said signals at a receiving end;

separate program clock references from base signal portions;

use a plurality of program clock references in a least squares linear regression fitting procedure; and set a clock rate based on the data output from the least squares linear regression procedure.

2. A method of claim 1, where
"network" is further defined as a packet network.

3. A method of claim 1, where
a receiver clock signal t is a slave,
a transmitter clock signal $T_s(t)$ is a master, said receiver clock is related to the transmitter clock by a linear transform in accordance with:

$$T_s(t) = at + b$$

where t is the receiver's original clock signal, a is an estimate of frequency drift, and b is an offset.

4. A method of claim 3, comprising the step of using an estimation of $\hat{T}_s(t)$ of the master clock to slave said receiver clock to the master in accordance with:

$$\hat{T}_s(t) = \hat{a} \cdot t + \hat{b}$$

where it is the receiver's original clock signal,
â is an estimate of frequency drift,
and b̂ is the time offset.

5. A method of claim 3, where â and b̂ are computed in accordance with:

$$\hat{a} = \frac{\sum_{i=0}^{N} T_s^2(t_i) - N \cdot \bar{y}^2}{\sum_{i=0}^{N} T_s(t_i) \cdot (t_i + \Delta T_0 + \Delta t_i) - N \cdot \bar{x} \cdot \bar{y}}$$

$$\hat{b} = \bar{y}\hat{a} \cdot \bar{x}$$

where $$\bar{x} = \frac{\sum_{i=0}^{N}(t_i + \Delta T_0 + \Delta t_i)}{N}$$

$$\bar{y} = \frac{\sum_{i=0}^{N} T_s(t_i)}{N}.$$

6. A method of claim 5, where the receiver estimates frequency drift $\hat{a}_i$ and clock offset $\hat{b}_i$ by processing said clock references $\hat{T}_s(t)$ of the master clock collected through a data transmission network and clock references locally provided by the slave in accordance with:

$$\hat{a}_i = \frac{\sum_{k=0}^{N-1} T_s^2(t_{i-k}) - N \cdot \bar{y}_i^2}{\sum_{k=0}^{N-1} T_s(t_{i-k}) \cdot (t_{i-k} + \Delta T_0 + \Delta t_{i-k}) - N \cdot \bar{x}_i \cdot \bar{y}_i}$$

-continued $$\hat{b}_i = \bar{y}_i - \hat{a}_i \cdot \bar{x}_i.$$

7. A method of claim 6, where the receiver clock is synchronized in accordance with:

$$\hat{T}_s(t) = \hat{a}_i t + \hat{b}$$

and where t is computed in consecutive intervals according to:

$$t_i + \Delta T_0 + \Delta t_i < t < t_{i+1} + \Delta T_0 + \Delta t_{i+1}.$$

8. A method of claim 6, where recursion is applied as follows:

$$\sum_{k=0}^{N-1} T_s^2(t_i - t_k) = \sum_{k=1}^{N} T_s^2(t_{i-k}) + T_s^2(t_i) - T_s^2(t_{i-N})$$

$$\sum_{k=0}^{N-1} T_s(t_{i-k}) \cdot (t_{i-k} + \Delta T_0 + \Delta t_{i-k}) = \sum_{k=1}^{N} T_s(t_{i-k}) \cdot (t_{i-k} + \Delta T_0 + \Delta t_{i-k}) + T_s(t_i) \cdot (t_i + \Delta T_0 + \Delta t_i) - T_s(t_{i-N}) \cdot (t_{i-N} + \Delta T_0 + \Delta t_{i-N})$$

$$\frac{\sum_{k=0}^{N-1} T_s(t_{i-k})}{N} = \frac{\sum_{k=1}^{N} T_s(t_{i-k}) + T_s(t_i) - T_s(t_{i-N})}{N}$$

$$\frac{\sum_{k=0}^{N-1} (t_{i-k} + \Delta T_0 + \Delta t_{i-k})}{N} = \frac{\sum_{k=1}^{N} (t_{i-k} + \Delta T_0 + \Delta t_{i-k})}{N} + \frac{(t_i + \Delta T_0 + \Delta t_i) - (t_{i-N} + \Delta T_0 + \Delta t_{i-N})}{N}$$

$$\hat{a}_i = \frac{\sum_{k=0}^{N-1} T_s^2(t_{i-k}) - N \cdot \bar{y}_i^2}{\sum_{k=0}^{N-1} T_s(t_{i-k}) \cdot (t_{i-k} + \Delta T_0 + \Delta t_{i-k}) - N \cdot \bar{x}_i \cdot \bar{y}_i}$$

$$\hat{b}_i = \bar{y}_i - \hat{a}_i \cdot \bar{x}_i.$$

9. A method of claim 8, where the equations are applied to a plurality of program clock reference sets which are interleaved in time.

10. A method of claim 8, where at least one of the program clock references is multiplied by a weighting factor.

11. A method of claim 7, comprising the steps
collecting clock references of a reference clock;
collecting clock references of a local clock;
processing said clock references based upon values for frequency drift and clock offset; and
updating said values for frequency drift and clock offset.

12. A method of claim 11, where the updated values for frequency drift and clock offset are used to synchronize a slave clock to the master clock of a transmitting end.

13. A method of claim 11, comprising the steps
collecting clock references from a data transmission network;
storing said clock references in a buffer;
adding said clock references to a first element of said buffer and to a value kept in a memory;
collecting clock references from a local clock;
storing said local clock references in a second buffer; and
adding said local clock references to the first element of the second buffer, and to a second value kept in a memory.

14. An apparatus for synchronizing two clocks, a slave clock and a master clock, one each at two terminal ends of a transmission network, the apparatus comprising:
two inputs and two outputs,
a first input to receive values for program clock references of a received signal, and a second input to receive values representative of a local time;
a first output which represents frequency drift and a second output which represents time offset; the slave time being regulated by:

$$T_s(t) = aT_r(t) + b$$

where $T_s$ is clock references of the master clock, $T_r$ is the time of the slave clock, a is the frequency drift and b is the time offset.

15. An apparatus of claim 14, said first input being coupled to a first summation module, said second input being coupled to a second summation module, the second input being coupled to a squaring operator having an output coupled to a third summation module, each input being further coupled to a first multiplier, the first multiplier having an output coupled to a fourth summation module.

16. An apparatus of claim 15, the output of the second summation module being coupled to a second squaring operator, an output of the third summation module being coupled to a second multiplier operable for multipling the output against the number of received samples, an output of the fourth summation module being coupled to a third multiplier operable for multiplying the output against the number of received samples, outputs of the first and second summation modules being coupled to the inputs of a fourth multiplier, an output of the first summation module being coupled to a fifth multiplier operable for calculation the product of an output of first summation module and a computed frequency drift value.

17. An apparatus of claim 16, an output of said third multiplier and an output of said fourth multiplier being connected to inputs of a first adder, an output of said second multiplier and an output of said second squaring operator being coupled to a second adder, an output of said second summation module and an output of said fifth multiplier being connected to inputs of a third adder having an output connected to a first divider operable for dividing a value at the first dividers input by the number of samples received at the inputs of the apparatus whereby the output yields a time offset value.

18. An apparatus of claim 17, an output of said first adder and an output of said second adder being connected to a second divider whereby an output yields a value for frequency drift.

* * * * *